April 15, 1969  M. G. STRAUSS  3,439,187
ANTILOGARITHMIC FUNCTION GENERATOR
Filed Aug. 2, 1966  Sheet 2 of 2

Inventor
Michael G. Strauss
Roland A. Anderson
Attorney

United States Patent Office 3,439,187
Patented Apr. 15, 1969

3,439,187
ANTILOGARITHMIC FUNCTION GENERATOR
Michael G. Strauss, Downers Grove, Ill., assignor to the United States of America as represented by the United States Atomic Energy Commission
Filed Aug. 2, 1966, Ser. No. 569,759
Int. Cl. G06g 7/12, 7/26
U.S. Cl. 307—229    6 Claims The invention described herein was made in the course of, or under, a contract with the U.S. Atomic Energy Commission.

This invention relates to antilogarithmic function generators and more particularly to generators for generating the antilogarithm of a pulsed input logarithmic signal.

Antilogarithmic and logarithmic function generators are useful circuits often employed as components in computers to perform arithmetic operations on signals conveying experimental data. For example, such arithmetic operations are performed in nuclear physics for the following purposes:

(a) Identification of charged particles (protons, deuterons, tritons) by measuring the rate at which they lose energy or by measuring the time of flight.

(b) Measurement of mass yield in fission.

(c) Determination of the location of impact of a particle in a position/energy-sensitive semiconductor detector.

Present antilogarithmic function generators comprise a summing circuit connected to a triode transitor having a reference current applied thereto, which reference current constitutes the quiescent current through the transistor. The output pulse of the antilogarithmic generator is proportional to the change in the collector current of the transistor due to the summed signal applied to the base thereof and is directly proportional to the reference current applied to the transistor. This type of circuit presents problems in pulsed operation. First, since the antilogarithmic output signal is directly proportional to the reference current applied to the transistor, the reference current must be regulated so it will remain constant and unaffected by input pulses. Second, a current component must be added to the collector signal current to obtain the desired relationship wherein the change in collector current is directly proportional to the exponential of the change in emitter-base voltage of the transistor.

Logarithmic function generators are generally temperature dependent and require compensation therefor. For example, the logarithmic function generator described by applicant in his application entitled Logarithmic Function Generator, S.N. 569,761, filed Aug. 2, 1966, generates an output signal $$\text{Log } X = \frac{kT}{q} \ln \frac{I_\text{X}}{I_\text{RL}}$$

where:

$k$=Boltzmann constant=$1.381 \times 10^{-23}$ joule/° K.
$T$=Temperature in ° K.
$q$=Electronic charge=$1.6 \times 10^{-19}$ coulomb
$I_\text{X}$=Value of input current pulse
$I_\text{RL}$=Quiescent reference current pulse for the logarithm triode transistor Circuitry external to the function of logarithm generation is requisite to compensate for this temperature dependency, which circuitry is complex and difficult to design. Antilogarithmic function generators generally also enjoy a similar temperature dependency which must be compensated for with external circuitry.

Accordingly, it is one object of the present invention to provide an improved antilogarithmic function generator for generating the antilogarithm of a pulsed input logarithmic signal.

It is another object of the present invention to provide in an antilogarithmic function generator comprising a transistor having a reference current applied thereto a device for maintaining the reference current at a constant value independent of applied input logarithmic signals.

It is another object of the present invention to provide a transistor antilogarithmic function generator wherein a change in collector current is directly proportional to the exponential of a change in emitter-base voltage from an applied logarithmic input pulsed signal.

It is another object of the present invention to provide an antilogarithmic function generator which when coupled to a logarithmic function generator having an output $$\text{Log } X = \frac{kT}{q} \ln \frac{I_\text{X}}{I_\text{RL}}$$

wherein:

$k$=Boltzmann constant=$1.381 \times 10^{-23}$ joule/° K.
$T$=Temperature in ° K.
$I_\text{X}$=Value of input current pulse
$I_\text{RL}$=Quiescent reference current pulse for the logarithm triode transistor provides a logarithmic-antilogarithmic function generator combination which is temperature independent.

Further objects of the present invention will become more apparent as the detailed description proceeds.

In general, the present invention comprises a triode transistor having the emitter grounded with the output taken from the collector and the input applied to the base. A quiescent reference first current flows through the collector of the transistor. Difference measuring means compare this reference current to a second current equal to the quiescent value of the first current to give a signal proportional to any difference therebetween. Means responsive to this signal regulate the first current in the absence of an applied input signal to the base of the transistor. Means are provided for adding a third current equal to the quiescent value of the first current to the collector of the transistor in the presence of an input to the transistor.

Furher understanding of the present invention may best be obtained from consideration of the accompanying drawing wherein.

Figure 1:
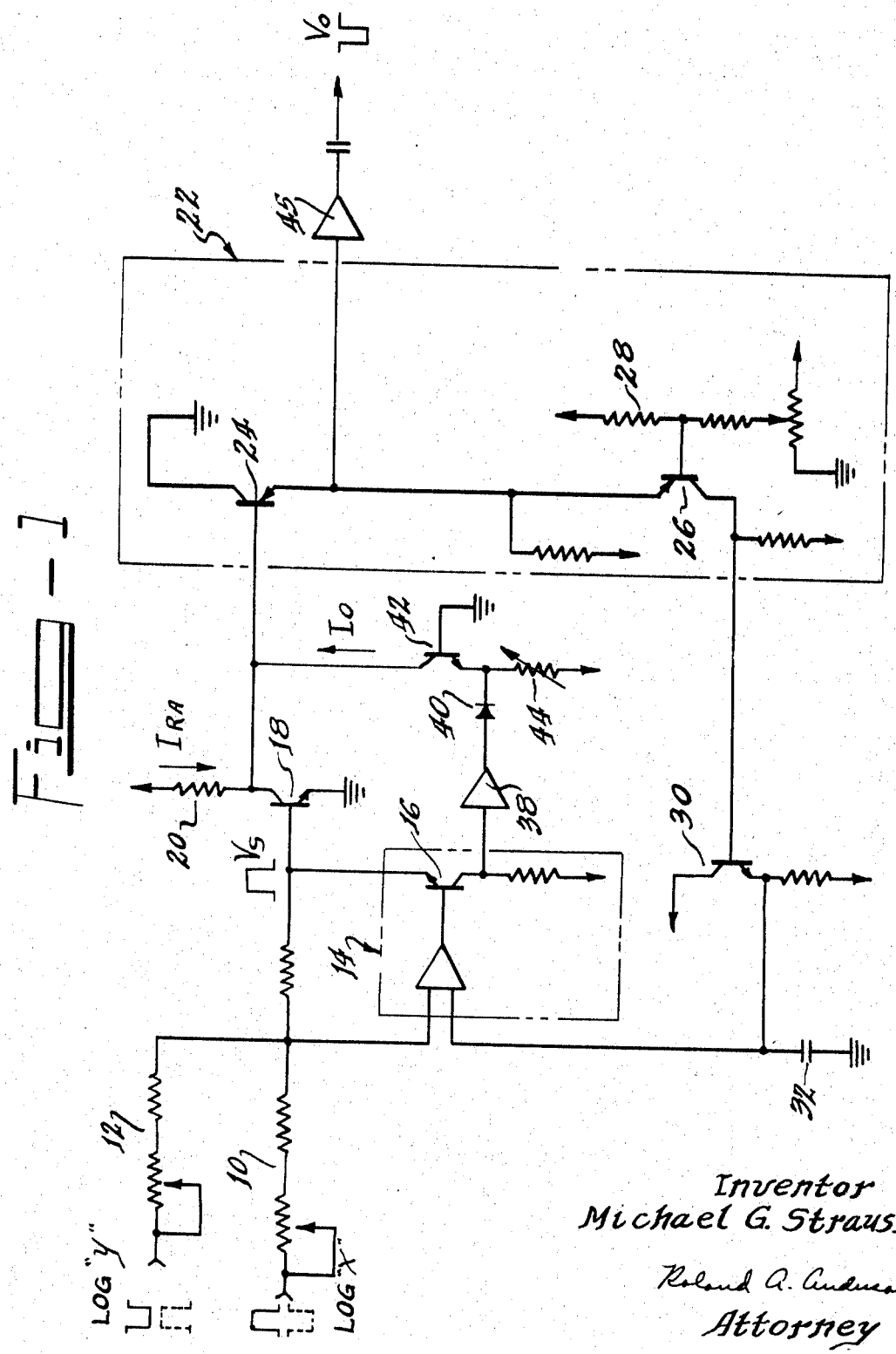
FIG. 1 is a simplified electrical schematic of an antilogarithmic function generator constructed according to the present invention.

In FIG. 1, logarthmic input pulses X and Y are transmitted through resistors 10 and 12, respectively, as shown, to a logarithmic summing and multiplying amplifier 14. Only two logarithmic pulse inputs, X and Y, are illustrated; however, it is to be understood that more than these inputs may be used. The summing amplifier 14 adds the logarithmic pulses X and Y to generate a combined output voltage pulse $V_\text{S}$. Voltage pulse $V_\text{S}$ is taken from the emitter of the output transistor 16 of amplifier 14 and connected to the base of an antilogarithmic transistor generator 18. A power supply provides a quiescent reference current $I_\text{RA}$ through resistor 20 to the collector of the antilogarithmic transistor 18. The emitter of the transistor 18 is electrically grounded.

The collector of antilogarithmic transistor 18 is connected to the input of a difference amplifier 22 comprising two transistors 24 and 26 having common emitters. The base of transistor 26 is connected through a resistor 28 (which is identical to resistor 20) to the same power supply which generates the reference current $I_\text{RA}$ for transistor 18. The output from the difference amplifier 22, taken from the collector of transistor 26, is applied to the base of a transistor 30. The output of transistor 30 taken from the emitter thereof is connected to summing amplifier 14 to control the emitter potential of the output stage 16. A capacitor 32 is connected from the output of transistor 30 to electrical ground.

In operation, the input logarithmic pulses X and Y are applied through resistors 10 and 12 to the input of the summing amplifier 14. The resistors 10 and 12 permit multiplication of the logarithmic signals X and Y by constants, wherefrom exponentiation of X and Y may be effected. The summing amplifier 14 combines the logarithmic pulse inputs X and Y to give an output pulse $V_S$ therefrom. This voltage $V_S$ is then applied to the base of the antilogarithmic transistor 18. The output pulse from transistor 18 is proportional to the change in collector current due to the signal $V_S$ applied at the base thereof. This change is equal to $$\Delta I_C = I_{RA}[\exp(q\Delta V_{BE}/kT) - 1]$$

where:

$\Delta V_{BE} = V_S$
$q$ = Electronic charge = $1.6 \times 10^{-19}$ coulomb
$k$ = Boltzmann constant = $1.38 \times 10^{-28}$ joules/° K.
$T$ = Temperature in ° K.
$I_{RA}$ = The quiescent reference current flowing through resistor 20
$\Delta I_C$ = The output collector current pulse of the transistor 18

To maintain the quiescent reference current $I_{RA}$ constant for the above equation, the difference amplifier 22, in the absence of input pulses X and Y, compares the value thereof to the reference current generated through resistor 28. If there is any difference, a signal will be emitted by the amplifier 22 at the collector of transistor 26. This error signal is amplified by transistor 30 and applied to summing amplifier 14 to change the emitter potential of the output transistor 16 thereof. This, in turn, varies the potential on the base of antilogarithmic transistor 18 to maintain the quiescent reference current $I_{RA}$ constant.

In the presence of a logarithmic input pulse X or Y, transistor 26 of difference amplifier 22 and transistor 30 are cut off, thereby temporarily opening the feedback loop. The capacitor 32, in addition to causing transistor 30 to cut off, maintains the prepulse emitter voltage of transistor 30, whereby a steady-state input to the summing amplifier 14 is maintained. When the input logarithmic pulse X or Y terminates, the stabilizing feedback loop closes again by the energizing of transistor 26 in difference amplifier 22 and the small charge which has leaked off capacitor 32 while the input pulse was present is rapidly restored through transistor 30.

Referring to the equation for $\Delta I_C$ as hereinbefore written, the $-1$ term must be removed therefrom to obtain the desired relationship of $$\Delta I_C = I_{RA}[\exp(q\Delta V_{BE}/kT)]$$

wherefrom the output signal from the antilogarithmic transistor is directly proportional to the exponential of $V_S$. To effect this relationship, a signal equal to the quiescent reference current $I_{RA}$ is added to the collector signal of antilogarithmic transistor 18. A limiter circuit 38 has its input connected to the collector of the output stage transistor 16 of summing amplifier 14 and its output connected through a diode 40 to the emitter of a transistor 42. The emitter of transistor 42 is also connected through a variable resistor 44 to a power supply. The collectors of transistors 18 and 42 are interconnected.

The power suplpy generates a current $I_O$ through variable resistor 44, which current normally flows through diode 40. When a logarithmic pulse from summing amplifier 14 activates the limiter circuit 38, the current through resistor 44 is routed from diode 40 to transistor 42 and thereby added to the signal current in antilogarithmic transistor 18. The output antilogarithmic signal $V_O$ of the generator is taken from the emitter of transistor 24 through an amplifier 45.

Figure 2:
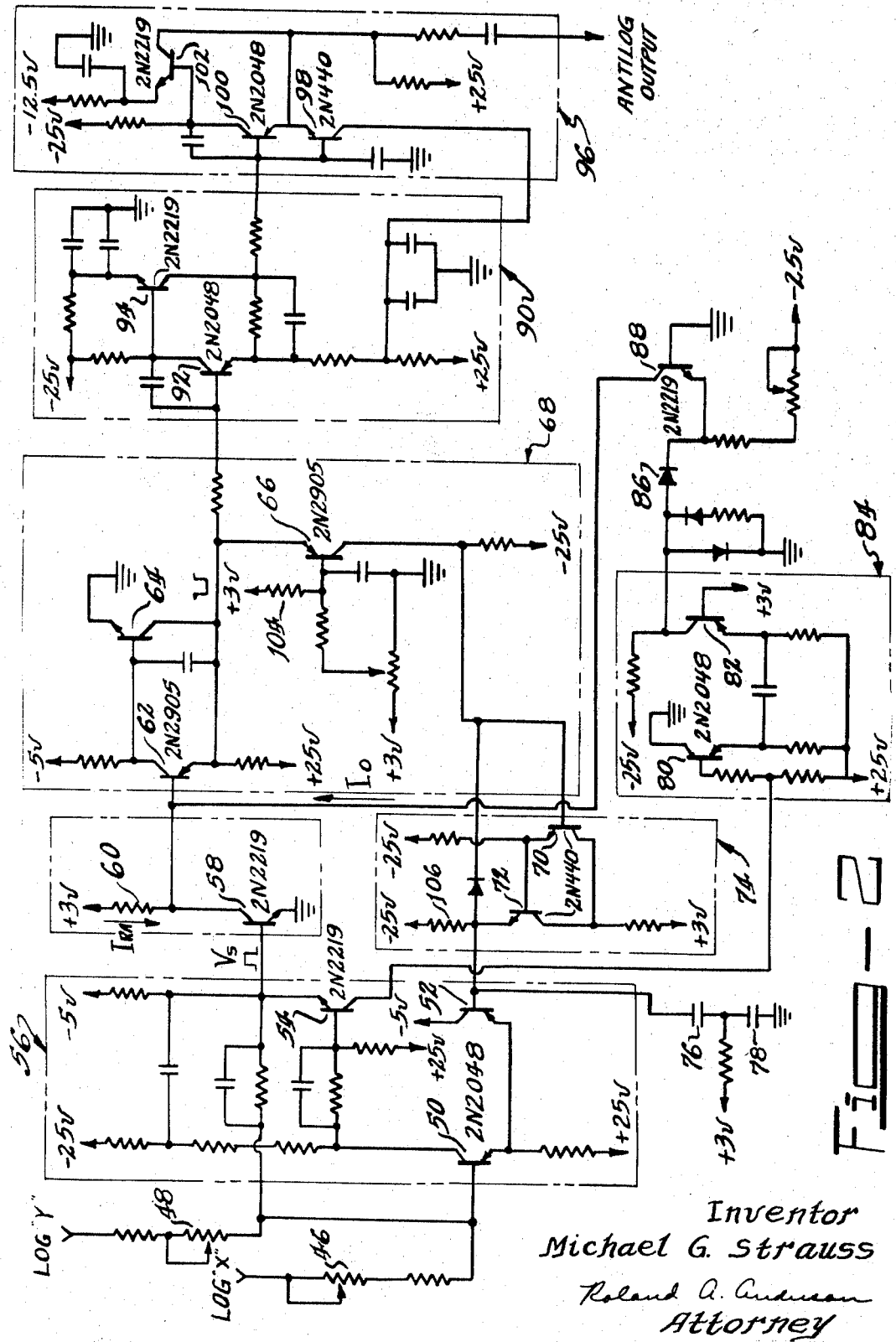
FIG. 2 is a detailed electrical schematic of an antilogarithmic function generator constructed according to the present invention.

Turning to FIG. 2, a detailed schematic diagram of an embodiment constructed according to the present invention is set forth. As for FIG. 1, the inputs are shown for pulsed logarithmic signals X and Y only. It is to be also understood that this embodiment is not to be limited thereto but may embrace a plurality of input logarithmic signals. The input logarithmic pulse signals X and Y are applied through resistors 46 and 48, respectively, to the base of a transistor 50. Transistor 50 is connected in a difference amplifier arrangement with transistor 52. The collector of transistor 50 is connected via a resistor-capacitor network to the base of a transistor 54. The transistors 50, 52 and 54 comprise logarithmic summing amplifier 56.

The output of the summing amplifier 56 taken from the emitter of transistor 54 is applied to the base of an antilogarithmic function generator transistor 58. A quiescent reference current $I_{RA}$ is applied to the collector of transistor 58 through a resistor 60. The collector of antilogarithmic transistor 58 is connected to the base of a transistor 62 which, together with transistor 64, is connected in a White emitter follower arrangement. The emitter of transistor 62 and collector of transistor 64 are connected to the emitter of a transistor 66 to form therewith a difference amplifier 68. The output of the difference amplifier 68 taken from the collector of transistor 66 is fed to the base of a transistor 70 which, together with a transistor 72, forms a cascaded emitter follower 74. The output of the cascaded emitter follower taken from the emitter of transistor 72 is connected to the base of transistor 52. The emitter of transistor 72 is also connected through capacitors 76 and 78 to electrical ground.

The collector of transistor 54 (the output stage of summing amplifier 56) is connected via a resistor to the base of a transistor 80 which, together with transistor 82, forms a limiter circuit 84. The output of the limiter circuit taken from the collector of transistor 82 is connected through a diode 86 to the emitter of a transistor 88. The collector of transistor 88 is connected to the colletcor of antilogarithmic transistor 58.

The output of the embodiment of FIG. 2 is taken from the emitter of transistor 62 and passed through an output amplifier 90, comprising transistors 92 and 94 connected in a feedback arrangement, and through an output driver 96 comprising transistors 98, 100 and 102 connected in a White emitter follower arrangement.

The embodiment of FIG. 2 operates in a similar manner to the embodiment of FIG. 1 to produce a signal which is proportional to the exponential of $V_S$, the sum of the applied logarithmic pulses. The summing amplifier 56 comprising transistors 50, 52 and 54 controls the base voltage and, in turn, the collector current of the antilogarithmic transistor 58. In the steady-state condition, the potential at the base of transistor 52 controls the potential at the base of anilogarithmic transistor 58 so as to maintain the quiescent reference cusrent $I_{RA}$ constant. When input logarithmic pulsed signals X and Y are present, they are summed at the base of transistor 50 while the base of transistor 52 is kept steady by capacitors 76 and 78 in a manner hereinafter to be explained. The output of the summing amplifier 56, $V_S$, taken from the emitter of transistor 54 is applied to the base of antilogarithmic transistor 58 to thereby generate the antilogarithmic function thereof. Since the base impedance of antilogarithmic transistor 58 is a function of the input signal $V_S$, the output impedance of the summing amplifier 56 is designed to be low so as not to affect the accuracy of the antilogarithmic function generator. To obtain high gain in the summing amplifier 56, the collector of transistor 50 is bootstrapped to the emitter of transistor 54.

To maintain the quiescent reference current $I_{RA}$ constant, the difference amplifier 68 is used. The transistors 62 and 64 constitute a low output impedance White emitter follower which is capable of driving the emitter of transistor 66 linearly. The transistors 62 and 66 form the difference amplifier 68 wherein drift in the quiescent reference current $I_{RA}$ results in an error signal at the collector of transistor 66. This error signal is amplified by transistors 70 and 72 and applied to the base of transistor 52 so as to correct the bias of antilogarithmic transistor 58 to maintain the quiescent reference current $I_{RA}$ constant. The difference amplifier 68 is designed so that imbalance in the circuits associated with transistors 62 and 66 will not be interpreted as drift in the quiescent reference current $I_{RA}$. Thus, the +3-volt supply is common to both resistors 60 and 104. Further, to minimize differential changes in the characteristics of transistors 62 and 66, the transistors 62 and 66 are a matched pair in a single housing so as to maintain them at the same temperature.

As stated for the embodiment of FIG. 1 and as applicable to the embodiment of FIG. 2, the regulation of the quiescent reference current $I_{RA}$ is effective in the absence of an applied logarithmic input pulse signal. An input logarithmic pulse signal cuts off transistor 66 and, in turn, transistor 72 to open the reference current stabilizing feedback loop. Ideally, the potential at the base of transistor 52 in summing amplifier 56 should not change during the presence of an applied logarithmic input pulse signal. Capacitors 76 and 78 maintain the prepulse emitter voltage of transistor 72; however, some leakage is effected via resistor 106. Upon the cessation of the applied input logarithmic pulse signal, the transistors 66 and 72 resume conduction and capacitors 76 and 78 are recharged through the low emitter impedance of transistor 72. The exact time at which the charging process begins depends upon the shape of the pulse at the emitter of transistor 66. If a tail of only a few millivolts is present at the trailing edge of the pulse, transistor 66 will resume conduction gradually and therefore charge the stray capacity at its collector slowly. Transistor 72 cannot start to conduct or charge capacitors 76 and 78 until the stray capacity is charged. Thus, the period during which the feedback loop is open is in effect slightly longer than the apparent pulse duration. If the pulse at the emitter of transistor 66 has a slight overshoot at the trailing edge thereof instead of a tail, transistors 66 and 72 will instantly resume conduction and capacitors 76 and 78 will be charged rapidly.

The addition of a current $I_O$ equal to the quiescent reference signal $I_{RA}$ at the collector of antilogarithmic transistor 58 is accomplished with the limiter circuit 84 and diode 86. The negative pulse at the collector of transistor 54 cuts off transistor 82 and also diode 86 which normally conducts via resistor 108. The current through resistor 108 ($I_O$) is thereby switched via transistor 88 to the collector of antilogarithmic transistor 58. Since the collector of transistor 54 assumes different voltages with different settings of exponent resistors 46 and 48, the embodiment requires capacitor coupling at transistor 82. The emitter of transistor 82 serves as a diode D-C restorer for negative pulses. Thus, responsive to the application of input logarithmic pulse signals, the current $I_O$ through resistor 108 is applied to the collector of antilogarithmic transistor 58, whereby the output of transistor 58 $\Delta I_C$ is equal to $I_{RA}[\exp(qV_S/kT)]$.

The output collector current from antilogarithmic transistor 58 is transmitted through a feedback amplifier 90 comprising transistors 92 and 94 and White emitter follower output driver 96.

The output of the antilogarithmic function generator of FIGS. 1 and 2 is $$\Delta I_C = I_{RA} e^{\frac{qV_S}{kT}} = I_{RA} e^{\frac{qV_{EB}}{kT}}$$

where:

$\Delta I_C$ = Output of antilogarithm generator
$I_{RA}$ = Quiescent reference current applied to the antilogarithm transistor
$e$ = Base of natural logarithm
$q$ = Electronic charge = $1.6 \times 10^{-19}$ coulomb
$V_{EB}$ = Emitter-base voltage of the antilogarithm element = $V_S$
$k$ = Boltzmann constant = $1.38 \times 10^{-28}$ joules/° K.
$T$ = Temperature in ° K.

The output signals of the logarithm function generator as taught by applicant in his applications S.N. 569,761, filed Aug. 2, 1966, are $$\Delta V_{EB} = \frac{kT}{q} \ln \frac{I_X}{I_{RL}}$$

where:

$\Delta V_{EB}$ = Charge in emitter-base voltage of the logarithm transistor
$k$ = Boltzmann constant = $1.38 \times 10^{-28}$ joules/° K.
$T$ = Temperature in ° K.
$q$ = Electronic charge = $1.6 \times 10^{-19}$ coulomb
$I_X$ = Value of input current pulse to the logarithm transistor
$I_{RL}$ = Value of quiescent reference current applied to the logarithm transistor Where the output of such a logarithmic generator is coupled to the antilogarithmic generator of the present invention, a logarithm-antilogarithm generator combination results whose output $\Delta I_C$ is independent of temperature provided the temperatures of the two generators are maintained at the same value. This effect is readily apparent by substituting the equation of the output of the logarithm generator for the term $\Delta V_{EB}$ in the equation for the output of the antilogarithm generator.

Persons skilled in the art will, of course, readily adapt the general teachings of the invention to embodiments far different than the embodiments illustrated. Accordingly, the scope of the protection afforded the invention should not be limited to the particular embodiment illustrated in the drawings and described above, but should be determined only in accordance with the appended claims.

The embodiments of the invention in which an exclusive property or privilege is claimed are defined as follows:

1. An antilogarithmic function generator for an input logarithmic pulse comprising a first triode transistor having an electrically grounded emitter, means for applying said input logarithmic pulse to the base of said transistor, the output of said transistor being taken from the collector thereof to provide a signal proportional to the antilogarithm of said input pulse, means for generating a quiescent reference first current, means for applying said first current to the collector of said transistor, means for generating a reference second current equal to the quiescent value of said first current, means for generating a signal proportional to a difference in value between said first and second currents, means responsive to said generated signal for regulating in the absence of said input logarithmic pulse the value of said first current, means for generating a third current equal to the quiescent value of said first current, and means for applying said third current to the collector of said transistor in the presence of said input logarithmic pulse.

2. The device according to claim 1 wherein said first current generating and applying means, said second current generating means and said first and second current difference signal generating means comprise a voltage source, a first resistor connected between said voltage source and the collector of said triode transistor, a difference amplifier having one input thereof connected to the collector of said triode transistor, a second resistor identical to said first resistor and interconnected of said voltage source and the other input of said difference amplifier, the output of said difference amplifier being proportional to the difference in value between the two inputs thereto.

3. The device according to claim 1 wherein said regulating means comprise a first emitter follower having the input thereof connected to the output of said difference generating means, a capacitor interconnected of the output of said first emitter follower and electrical ground, said first emitter follower and said capacitor forming a low-pass filter, and means for applying the output of said first emitter follower to the base of said triode transistor.

4. The device according to claim 3 wherein said input pulse applying means and said first emitter follower output applying means comprise a difference amplifier having one input thereof connected to the output of said first emitter follower, means for applying said input pulse to the other input of said difference amplifier, a second emitter follower having the input thereof connected to the output of said difference amplifier, and means for connecting the emitter output of said second emitter follower to the base of said triode transistor and to the said other input of said difference amplifier.

5. An antilogarithmic function generator for an input logarithmic pulse comprising a first triode transistor having an electrically grounded emitter, a first voltage source, first resistive means interconnected of said first voltage source and the collector of said first transistor to generate a quiescent reference first current therefor, a first difference amplifier, means for applying said input pulse to one input of said first difference amplifier, a first emitter follower having the input thereof connected to the output of said first difference amplifier, means for connecting the emitter output of said first emitter follower to the base of said first triode transistor and the said one input of said first difference amplifier, a second difference amplifier comprising second and third triode transistors having interconnected emitters, means for connecting the collector of said first triode transistor to the base of said second triode transistor, the collector of said second triode transistor being electrically grounded, second resistive means identical to said first resistive means interconnected of said first voltage source and the base of said third triode transistor, a second emitter follower having the input thereof connected to the collector of said third triode transistor, a capacitor interconnected of the output of said second emitter follower and electrical ground, said capacitor having a value to form with said second emitter a low-pass filter, means for connecting the output of said second emitter follower to the other input of said first difference amplifier, means for generating a second current equal to the quiescent value of said first current, and means for applying said second current to the collector of said first triode transistor in the presence of said input pulse, the output of said generator being taken from the interconnected emitters of said second difference amplifier.

6. The device according to claim 5 wherein said second current generating and applying means comprise a limiter circuit having the input thereof connected to the collector output of said first emitter follower, a diode having the anode thereof connected to the output of said limiter circuit, a second voltage source, third resistive means interconnected of the cathode of said diode and said voltage source to generate a second current equal to the quiescent value of said first current, a fourth triode transistor having an electrically grounded base, means for connecting the collector of said fourth triode transistor to the collector of said first triode transistor, and means for connecting the emitter of said fourth transistor to the cathode of said diode.

References Cited

UNITED STATES PATENTS

| | | | |
|---|---|---|---|
| 3,089,968 | 5/1963 | Dunn | 328—145 X |
| 3,293,450 | 12/1966 | Gibbons | 328—145 X |
| 3,320,530 | 5/1967 | Pearlman | 328—145 X |

DONALD D. FORRER, *Primary Examiner.*

U.S. Cl. X.R.

235—197; 328—145